United States Patent [19]

Ianniello et al.

[11] 3,923,422
[45] Dec. 2, 1975

[54] TAPER LINING FOR COMPOSITE BLADE ROOT ATTACHMENT

[75] Inventors: Daniel John Ianniello, Shelton; Robert Lee Faiz, Bridgeport; John Barry Sainsbury-Carter, Newtown, all of Conn.

[73] Assignee: United Technologies Corporation, Hartford, Conn.

[22] Filed: Oct. 17, 1974

[21] Appl. No.: 515,749

[52] U.S. Cl. ................ 416/226; 416/230; 416/241
[51] Int. Cl.² .......................................... B63H 1/26
[58] Field of Search ....... 416/226, 229, 230, 241 A, 416/135, 136, 141

[56] References Cited
UNITED STATES PATENTS
2,919,889   1/1960   Rubel ............................ 416/230 X 3,279,278   10/1966   Eldred ............................. 416/136
3,474,507   10/1969   Thompson ....................... 416/230
3,518,025    6/1970   Schmidt .......................... 416/136

*Primary Examiner*—Harold W. Weakley
*Attorney, Agent, or Firm*—Russell M. Lipes, Jr.

[57] ABSTRACT

A composite helicoptor rotor blade in which fiber tapes are utilized in laminate fashion to build up spar-type strap members which are twisted and wrapped around a vertically extending attachment pin with a taper or wedge construction where a strap wraps around the pin to control tensile load distribution across the width of the strap.

10 Claims, 7 Drawing Figures

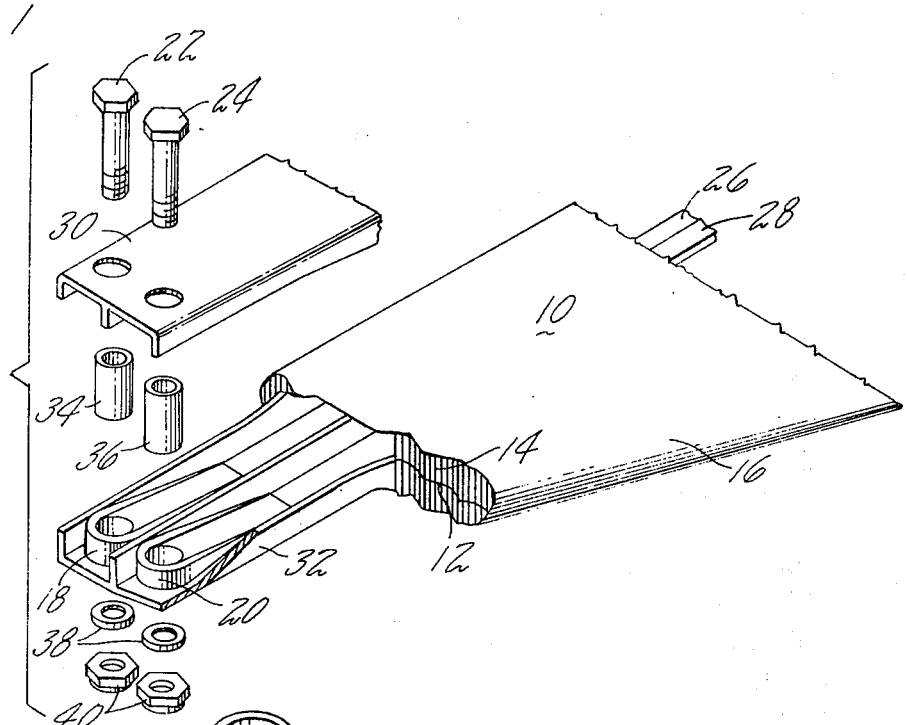
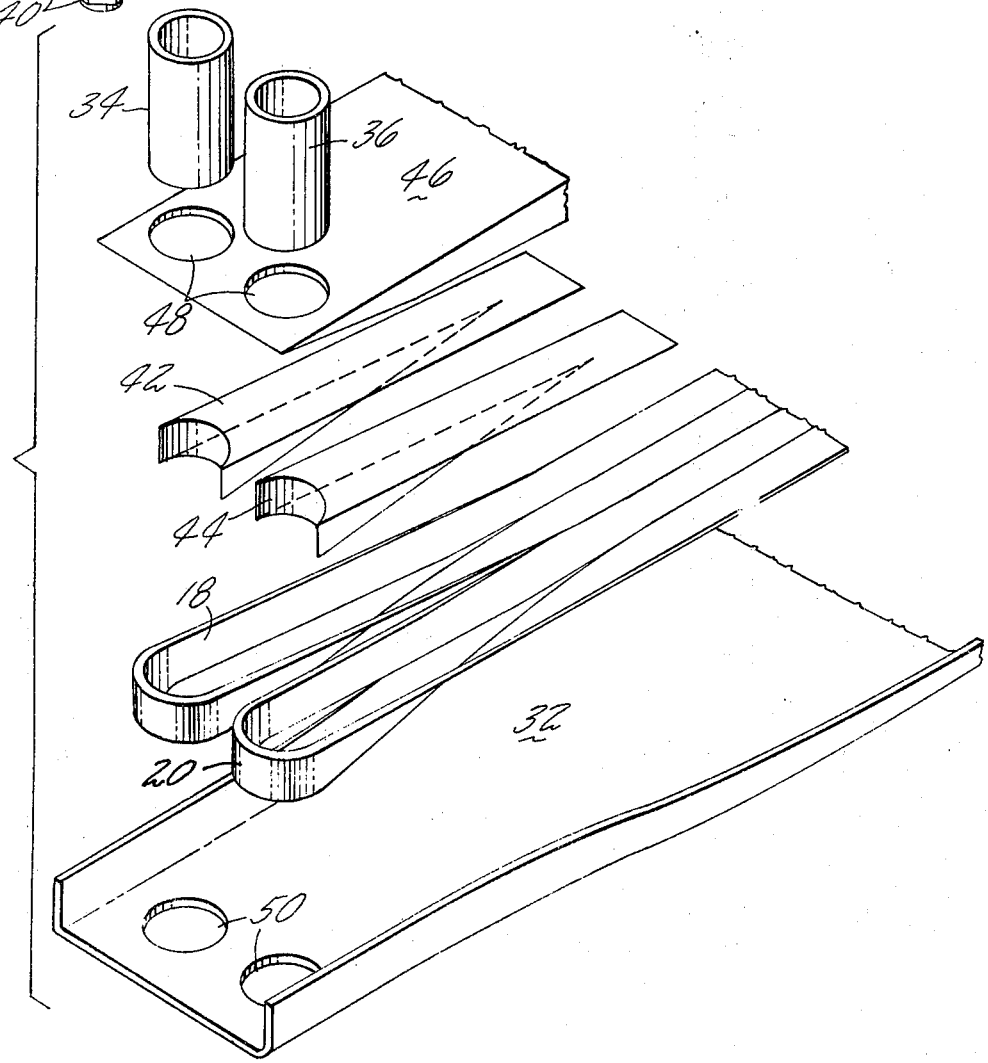

TAPER LINING FOR COMPOSITE BLADE ROOT ATTACHMENT

The invention herein described was made in the course of or under a contract or subcontract thereunder with the Department of the Navy.

BACKGROUND OF THE INVENTION

1. Field of the Invention

This invention relates to helicopter blades and more particularly to helicopter blades of the composite type which have spar-type strap members made from fiber tapes constructed in laminate fashion.

2. Description of the Prior Art

In the helicopter rotor art, fiber strand type elements have been used to produce a rotor blade, and in some constructions the fibers form loops in the region of the blade root for receiving bolts for connecting the blade to a rotor hub. British Pat. No. 756,673 of Sept. 5, 1956 to Clemens, British Pat. No. 973,587 of Oct. 28, 1964 to Belkow and Havill U.S. Pat. No. 1,846,258 teach the use of fiber strand elements extending from a helicopter or propeller blade to a hub and encircling a pin as blade retention means, but none of these patents teaches the twisted spar-type blade member construction of this invention.

Brunsch U.s. Pat. No. 3,476,484 teaches the use of two, double looped flanges of fibers for blade retention about pins, and Eldred U.S. Pat. No. 3,279,278 describes a laminated tie-bar employing shims between filament laminations to produce uniform loading, but neither reference teaches or discloses the twisted spar-type and load equalizing construction of this invention.

Zincone U.S. Pat. No. 3,754,840 is directed to a helicopter composite rotor blade construction having a U-shaped member of fiber material looped around a retention pin and called a twin-beam spar, and Salkind et al. U.S. Pat. No. 3,782,856 is directed to an improvement thereto having a redundant rotor hub connection. The construction of this invention is an improvement over the blade construction of both patents, which are assigned to applicants' assignee, United Aircraft Corporation.

SUMMARY OF THE INVENTION

One object of the invention is to provide an improved composite rotor blade for a helicopter.

Another object of the invention is to provide in a composite rotor blade for a helicopter an improved construction at the area of attachment of the blade to the rotor hub.

Still another object of the invention is to provide in a composite rotor blade for a helicopter having a twisted spar-type member, a wedge construction to control tensile load distribution across the width of the member.

In accordance with the present invention, a composite rotor blade for a helicopter having spar-type straps of relatively wide fiber material and in which the straps are twisted 90° and looped 180° around a vertical axis is provided with a taper or wedge construction where the straps wrap around a pin attaching the blade to a rotor hub connecting member to control the tensile loading across the width of the strap.

Other features and advantages will be apparent from the specification and claims and from the accompanying drawings which illustrate an embodiment of the invention.

BRIEF DESCRIPTION OF THE DRAWING

FIG. 1 is a fragmentary, partially exploded view of the root end of a composite rotor blade to which this invention is applicable, showing some of the blade elements and the pins for attaching the blade to a rotor hub connecting member.

FIG. 2 is an exploded view of the composite rotor blade root end of FIG. 1 showing the constructional features in the area of the root end.

DESCRIPTION OF A PREFERRED EMBODIMENT

Figure 3:
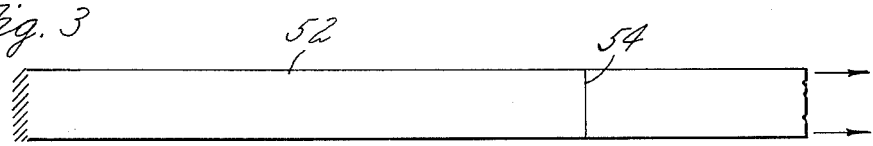
FIGS. 3, 4 and 5 are illustrative of what happens to the lengthwise extending fibers in a relatively thin and wide strap when the strap is fixed at one end and the other end is twisted 90°.

Referring to FIg. 1, the root or inboard end of a composite rotor blade 10 is shown in partial section and partial exploded view. The blade is made in two halves, an upper and a lower half, which are bonded together along bond line 12. Each half consists of central core 14, which may include a leading edge and trailing edge filler, having outer wrap 16 on its outside surface. Spar-type straps 18 and 20 of fiber tape construction and having a width to thickness ratio substantially greater than one extend a finite distance along the blade spa in the direction of the blade tip, and at the root end of the blade are twisted and looped to form openings for bolts 22 and 24 connecting the blade to a rotor hub connecting member not shown. The straps shown are part of the lower half of the blade, and there would be corresponding straps for the upper half of the blade, a spanwise length of the upper half straps appearing at 26, 28 in contact with outer wrap 16. The straps are placed flat in the blade structure except in the root area where a strap is twisted 90° and looped about a connecting bolt. The 90° twists are related so that the upper surface of a strap is common after the looping has been made. Each blade half includes as part of its root end a tub-like shape known as a torque wrap. The blade upper half torque wrap is indicated at 30, and the lower half torque wrap is indicated at 32. Bushings or liners 34 and 36 fit within the openings defined by the looping of straps 18 and 20, the bushings extending through both the upper and lower halves of the blade although separate bushings could be provided for each half of the blade. Washers 38 and nuts 40 are provided for the lower ends of the bolts to secure the bolts in position.

FIG. 2 shows the construction of the root end of the blade im more detail, the lower half portion of the blade being shown. In making the construction, lower torque wrap 32 is formed and straps 18 and 20 are placed in the torque wrap essentially filling it. In the figure, the surface of the straps in contact with the inner surface of the torque wrap, the lower surface of straps 18 and 20, is flat and essentially a straight line, and the upper surface, therefore, is inclined with respect to the torque wrap because of the 90° twisting and 180° looping of each strap. Teardrop fillers 42 and 44 fill the open areas within straps 18 and 20, respectively, created by the looping of each strap. Wedge-shaped filler 46 is positioned on top of the straps and teardrop fillers, the lower surface of the wedge-shaped filler conforming to the inclined upper surface of the straps and teardrop fillers and the upper surface of the wedge-shaped filler defining what would be a flat surface for mating with the upper half of the blade. The torque wrap, straps, teardrop fillers and wedge-shaped filler are bonded together along with other elements to form a unitary structure for half the rotor blade, and this composite structure is bonded to the other half of the rotor blade to form the complete rotor blade. Bushings 34 and 36 for receiving bolts 22 and 24, respectively, fit in openings 48 in wedge-shaped filler 46, the circular openings defined by the inner surface of the loops of straps 18 and 20 and the thicker end of teardrop fillers 42 and 44, and openings 50 in lower torque wrap 32.

Figure 4:
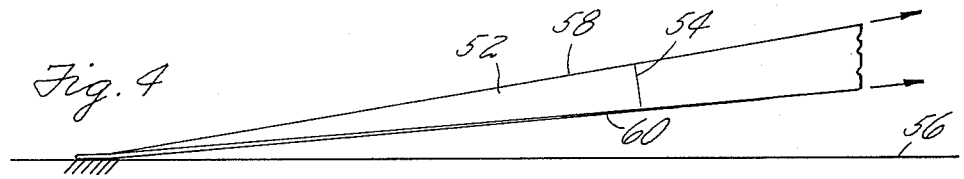
Figure 5:
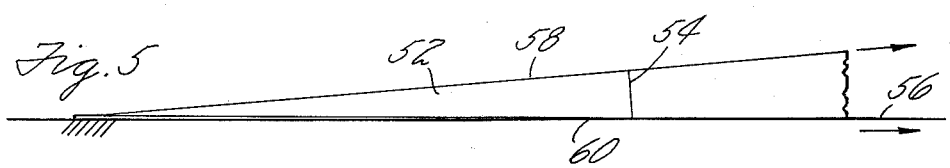

In order to understand the purpose of this invention, attention is directed to FIGS. 3, 4 and 5 which show what happens to longitudinally extending fiber strands in a strap or tape of relatively large width/thickness ratio when it is twisted through an angle of 90°. FIG. 3 shows strap 52 having transverse reference line 54 across its width. When the left end of the strap is fixed and a tension load is applied to the right end, the longitudinal fibers in the strap are loaded uniformly and the reference line remains at a right angle with respect to the edges of the strap. If, as in FIG. 4, which is an edgewise view of strap 52, the strap is twisted 90° and the right end of the strap is raised with respect to horizontal reference plane 56, reference line 54 assumes an angular position because of the apparent foreshortening of strap edge 58 with respect to strap edge 60. FIG. 5 depicts the twisting of the strap as it occurs in the blade structure of this invention. Here edge 60 remains parallel to or on reference plane 56 and edge 58 inclines with respect to the reference plane and edge 60. Reference line 54 assumes an angular position due to the foreshortening of fibers adjacent edge 58, but it is not as extreme a position as that in the exaggerated showing of FIG. 4. Obviously, in FIG. 5, if strap 52 were to be wrapped around a fixed vertical element, the fibers adjacent edge 58 would have a tensile loading greater than the fibers adjacent strap edge 60. The uniform loading of all of the fibers is the purpose of this invention.

Figure 6:
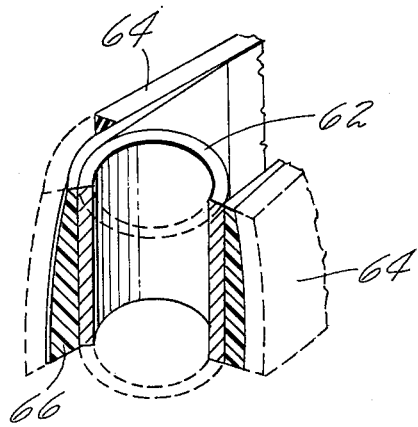
FIG. 6 is a schematic showing of a composite rotor blade root end construction employing a built-up wedge in accordance with this invention.

FIG. 6 shows built-up wedge construction providing equalized load distribution across the width of a spar-type strap like straps 18 and 20 in FIGS. 1 and 2. In this showing, 62 represents either a bolt or a straight-walled liner which would surround an attachment bolt. Strap 64 has a built-up portion 66 on its inside surface in the area where the strap is looped around the bolt or liner, and at the tape edge closest to the torque wrap. The built-up portion varies in thickness from one end to the other end to provide the taper necessary in equalizing load distribution, and the taper may or may not be linear in effective contour and preferably would be of a barrel shape. The built-up portion is blended out along the inside of the looped strap in an outboard direction. The thickness is greater toward the outer wrap of the blade.

Figure 7:
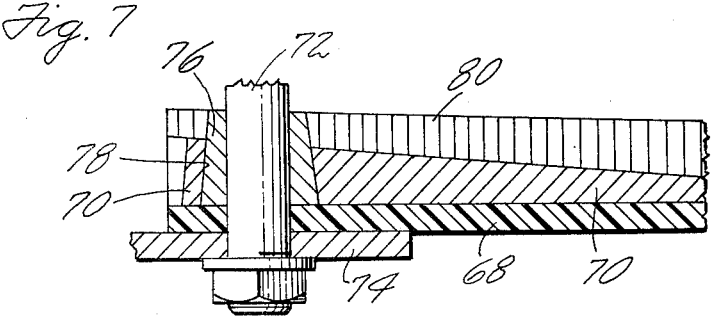
FIG. 7 is a schematic cross-section showing of a composite rotor blade root end construction employing a tapered bushing in accordance with this invention.

FIG. 7 shows an alternate construction in the use of a tapered bushing or liner to control the tensile load distribution across the width of a spar-type strap. In this cross-section showing of half of the root end of a composite rotor blade, torque wrap 68 contains spar-type strap 70 which is twisted 90° and looped 180° about bolt 72 connecting the blade structure to rotor hub connecting member 74. Since the lower surface of strap 70 is essentially a straight line contacting the inside surface of torque wrap 68, the upper edge of the strap is inclined and a foreshortening of strap fibers adjacent the upper edge of the strap occurs. To provide equalization of the tensile loading across the width of the strap, conical bushing 76 surrounds bolt 72 and is positioned between the bolt and the inside surface of strap 70 as it loops around the bolt. Outer surface 78 on the bushing is coned to the degree necessary to insure that the tensile loading on the strap will be equal across its width. The end of the bushing adjacent torque wrap 68 is the thickest, and the coned surface may or may not be a straight line. Wedge-shaped filler 80 is positioned against the inclined surface on strap 70 to provide a flat surface for mating with the other half of the blade structure.

Although the invention has been shown and described with respect to preferred embodiments thereof, it should be understood by those skilled in the art that changes and omissions in the form and detail thereof may be made therein without departing from the spirit and scope of the invention, which is to be limited and defined only as set forth in the following claims.

We claim:

1. In a composite rotor blade for a helicopter, at least one fiber strap constituting a spar-type member extending from the root area of said blade a finite distance along the span of said blade,
    said strap having a relatively large width to thickness ratio and generally being placed flat in the blade structure,
    connecting means securing said rotor blade to a rotor hub connecting member,
    said strap being twisted 90° and looped 180° about said connecting means,
    and means between said connecting means and said strap loop defining an inclined plane to provide for equal tension loading in the fibers of said strap.

2. A composite rotor blade in accordance with claim 1 in which the inclined plane defining means is a tapered bushing.

3. A composite rotor blade in accordance with claim 1 in which the inclined plane defining means in a built-up portion within the looped area of said strap.

4. A composite rotor blade for a helicopter having at least one spar-type member,
    said member being a fibrous strap having a relatively large width to thickness ratio,
    a first end of said member being positioned flatwise along at least part of the spar of said blade,
    a portion of said member in the root area of said blade being twisted 90°, looped 180°, and again twisted 90° with a second end of said member being positioned flatwise next to said first end,
    means extending through the 180° looping of said member for connecting said blade to a rotor hub connecting member,
    and inclined plane means interposed between the 180° looping of said member and said connecting means to provide uniform tension loading across the width of said member.

5. A composite rotor blade in accordance with claim 4 in which the upper surface of the first end of said member is also the upper surface of the second end of said member.

6. A composite rotor blade in accordance with claim 4 in which said first and second ends of said spar-type member extend the same distance along the span of said blade.

7. A composite rotor blade in accordance with claim 4 in which the connecting means is a cylindrical pin and the inclined plane means is a tapered bushing surrounding the pin.

8. A composite rotor blade in accordance with claim 4 in which the inclined plane means is a built-up area on the member within the 180° looping.

9. A composite rotor blade in accordance with claim 4 in which the effective surface of the inclined plane means has a non-linear contour.

10. A composite rotor blade in accordance with claim 4 in which the blade is made in an upper half and a lower half with at least one strap and one inclined plane means in each half and in which the inclined plane means has its greatest height adjacent the outer surface of the blade half.

* * * * *